US006493096B1

(12) United States Patent
Maeda et al.

(10) Patent No.: US 6,493,096 B1
(45) Date of Patent: Dec. 10, 2002

(54) METHOD OF DETERMINING REFLECTIVE SURFACE OF REFLECTOR IN VEHICLE LAMP

(75) Inventors: Masahiro Maeda, Shizuoka (JP); Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 254 days.

(21) Appl. No.: 09/678,369

(22) Filed: Oct. 2, 2000

(30) Foreign Application Priority Data

Oct. 1, 1999 (JP) .......................................... 11-281684

(51) Int. Cl.[7] ............................ G01B 11/24; G01J 1/00; F21V 7/00

(52) U.S. Cl. ....................... 356/612; 356/121; 362/518; 362/61

(58) Field of Search ................................ 356/612, 121; 362/518, 61

(56) References Cited

U.S. PATENT DOCUMENTS

| | | | | |
|---|---|---|---|---|
| 4,481,563 | A | 11/1984 | Snyder et al. | 362/296 |
| 4,495,552 | A | 1/1985 | Graff | 362/297 |
| 4,959,757 | A | 9/1990 | Nakata | 362/61 |
| 5,065,287 | A | 11/1991 | Staiger et al. | 362/61 |
| 5,452,191 | A | 9/1995 | Lopez | 362/297 |
| 5,655,828 | A | 8/1997 | Yamamoto et al. | 362/61 |
| 5,675,495 | A | 10/1997 | Biermann et al. | 364/468.03 |
| 5,707,141 | A | 1/1998 | Yamamoto et al. | 362/305 |
| 5,836,668 | A | 11/1998 | Ishikawa et al. | 362/61 |

FOREIGN PATENT DOCUMENTS

| | | |
|---|---|---|
| EP | 0 282 100 | 3/1988 |
| EP | 1 043 545 A2 | 4/2000 |
| GB | 2 295 004 A | 5/1996 |

*Primary Examiner*—Georgia Epps
*Assistant Examiner*—Jack Dinh
(74) *Attorney, Agent, or Firm*—Sughrue Mion, PLLC

(57) ABSTRACT

In a shape determining method of a reflective surface 10*a* of a reflector 1 in a vehicle lamp in such structure that a basic shape thereof is a free-formed surface 20 satisfying shape constraints etc. and that reflective surface elements are assigned to segments obtained by dividing the free-formed surface 20 into an array pattern, a reference plane is defined as a plane opposite to the free-formed surface 20 and normal to the optical axis Ax, and the free-formed surface 20 is projected onto the reference plane to determine the reflective surface. This permits uniform handling independent of the shape of the free-formed surface 20 and thus can simplify design steps and make the resultant shape of the reflective surface suitable. Thus, the reflective surface determining method of the reflector in the vehicle lamp permitting efficient creation of the segments on the free-formed surface and efficient creation of the reflective surface elements assigned to the respective segments can be realized.

11 Claims, 7 Drawing Sheets

METHOD OF DETERMINING REFLECTIVE SURFACE OF REFLECTOR IN VEHICLE LAMP

BACKGROUND OF THE INVENTION

1. Field of the Invention

The present invention relates to a method of determining a reflective surface of a reflector in a vehicle lamp used in vehicles such as automobiles and the like.

2. Related Background Art

The vehicle lamps need to meet (1) the conditions from the aspect concerning the function as lamps and, in addition thereto, (2) the conditions from the aspect concerning the shape (shape constraints) and (3) the conditions from the aspect concerning the appearance (appearance constraints) because of their use in a mounted state on the vehicles such as the automobiles and the like. It is thus necessary to realize lamps optimized as to the conditions from the functional aspect while satisfying the given constraints from the shape aspect and the appearance aspect.

The conditions from the functional aspect include light uniformity with which the entire lamp lights uniformly, light diffusibility with which light is properly diffused to be observed from various directions, and so on, depending upon types of lamps.

As for the constraints from the vehicle and body side, the shape constraints include conditions defined by the volume and shape of lamp receiving portions of the body, the continuous shape of the outer surface of the lamp (the outer surface of lens) from the other body portions, and so on. The appearance constraints include conditions resulting from harmony with the appearance of the other body portions, requirements from the design aspect of the body, and so on.

SUMMARY OF THE INVENTION

In recent years, there are increasing needs for lamps meeting strict shape constraints, e.g., further decrease in the depth of the lamp, because of restrictions on the lamp receiving portions from the aspect of construction of the body, the increasing tendency toward fascinating styling of cars, and so on. Under such circumstances, when a lamp was constructed, for example, using a reflector wherein the basic shape of its reflective surface was a unifocal paraboloid, decrease was insufficient in the thickness of the lamp and it was difficult to comply with the above-stated shape constraints such as the decrease in the depth of the lamp.

As against it, another reflector was proposed in such structure that the basic shape of the reflective surface was a free-formed surface created so as to match the shape constraints and other conditions. With use of the free-formed surface, it is relatively easy to meet the shape constraints such as the decrease in the depth of the lamp because of its degrees of freedom in designing thereof (for example, reference is made to Japanese Patent Application Laid-Open No. H09-33708). However, since reflective surface shapes of respective portions in the reflective surface need to satisfy the conditions from the functional aspect of reflecting the light from the light source into the direction along the given optical axis, they are normally formed in the shape of paraboloid of revolution or in the shape approximate thereto with light diffusing capability. Therefore, it is common practice to form the reflective surface by dividing the above-stated free-formed surface into a plurality of segments and assigning reflective surface elements having respective, reflective surface shapes of paraboloids of revolution to the respective segments.

In creating the reflective surface with the basic shape of the free-formed surface as described above, however, the shape often largely differs depending upon individual lamps, and the free-formed surface is often asymmetric because of the given shape constraints and the like. Therefore, there was the problem of complicated design steps for creating the segments on the free-formed surface used for determination of the reflective surface in each reflector and for determining the reflective surface shapes of the reflective surface elements assigned to the respective segments.

The present invention has been accomplished in view of the above problems and an object of the present invention is thus to provide a method of determining a reflective surface of a reflector in a vehicle lamp, which permits efficient creation of the segments on the free-formed surface and efficient creation of the reflective surface elements assigned to the respective segments.

In order to accomplish the above object, a method of determining a reflective surface of a reflector used in a vehicle lamp according to the present invention is a method comprising: (1) a free-formed surface creating step of creating a free-formed surface satisfying a predetermined shape constraint; (2) a reference plane defining step of defining a reference plane as a plane facing the free-formed surface; (3) a reference segment creating step of creating a reflective surface outline on the reference plane and dividing a region on the reference plane including the interior of the reflective surface outline, into a plurality of reference segments; (4) a representative point creating step of selecting reference representative points for the respective reference segments and projecting the reference segments and the reference representative points onto the free-formed surface, thereby creating dividing segments of the free-formed surface and representative points specifying positions for determining surface shapes in the segments; (5) a surface shape determining step of finding shape parameters at the representative points for the respective segments and determining the surface shapes in the segments, based on the shape parameters; and (6) a reflective surface determining step of assigning reflective surface elements having the surface shapes determined, to the respective segments to determine a reflective surface comprising a plurality of the reflective surface elements.

In the above reflective surface determining method, for the free-formed surface created as the basic shape of the reflective surface so as to satisfy the shape constraint from the body side, the steps of dividing it into segments and determining the surface shapes of the reflective surface elements assigned to the respective segments are not carried out directly on the free-formed surface the shape of which is complex and varies depending upon the reflective surface to be designed, but are done on the opposite reference plane defined separately. When the steps for determination of the reflective surface are not executed on the free-formed surface, but on the reference plane in this way, uniform handling becomes feasible independent of the shape of the reflective surface to be designed, which simplifies the design steps of the reflective surface.

The reference plane defined as a plane facing the free-formed surface is a plane equivalent to the field where an observer observes the reflector or the lamp. Therefore, when the reflective surface is created by making use of this reference plane, it becomes feasible to gain the reflective surface formed in the suitable shape and appearance of the reflective surface when observed from its axial direction, and provided with preferable light reflection characteristics.

Further, the determination of surface shape can be made more efficient when the surface shape is determined by selecting a representative point for each of the segments obtained by division. Particularly, when the representative points are also determined based on the selection of reference representative points in the reference segments on the reference plane, it becomes feasible to select the representative points on a uniform basis, independent of the shape of the free-formed surface.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
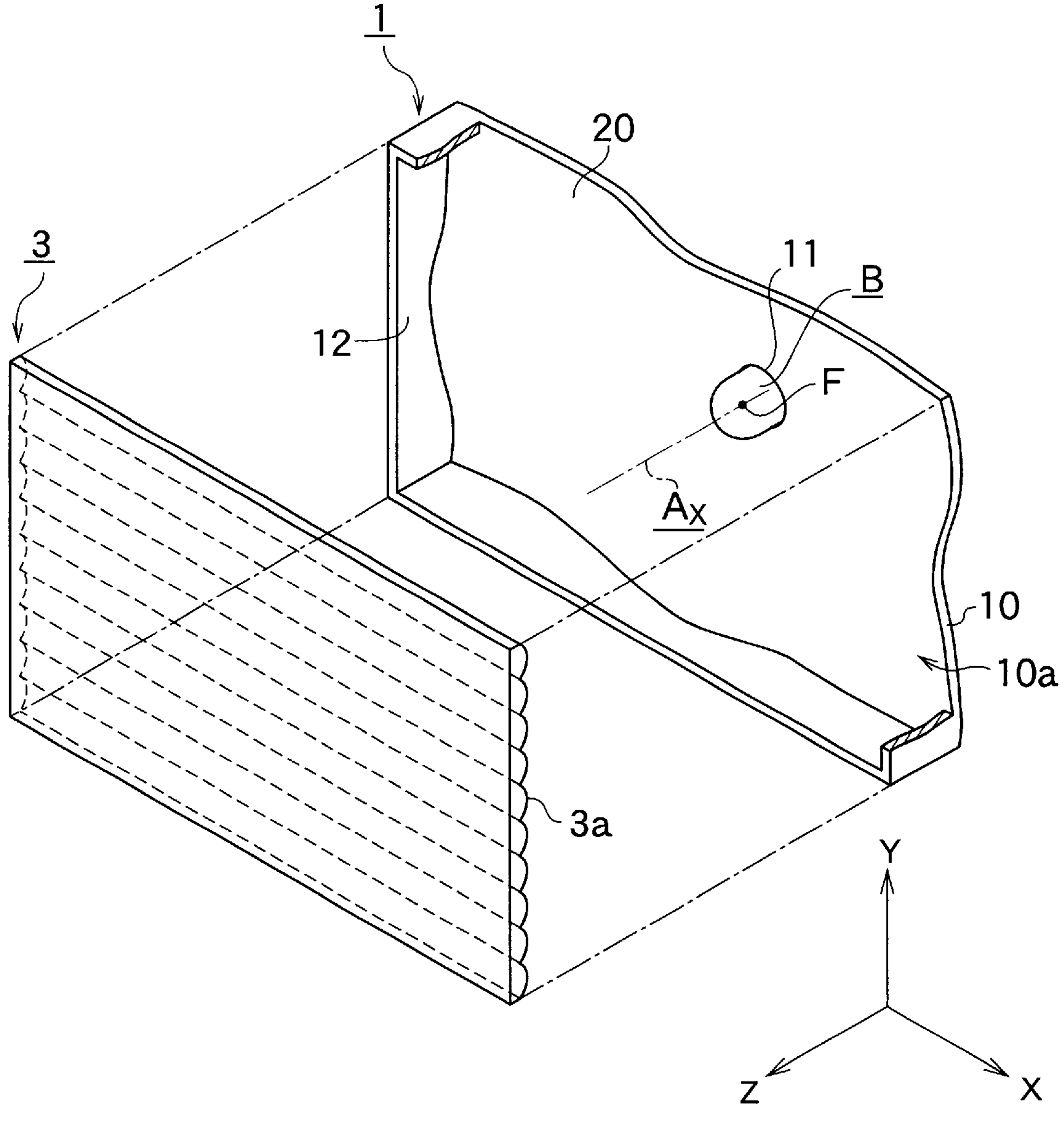
FIG. 1 is an exploded perspective view, partly broken, to show the structure of an embodiment of the vehicle lamp.

The preferred embodiment of the reflective surface determining method of the reflector in the vehicle lamp according to the present invention will be described below in detail with reference to the drawings. The same elements will be denoted by the same reference symbols in the description of drawings and redundant description will be omitted. It is also noted that dimensional ratios in the drawings do not always exactly match those in the description.

Figure 2:
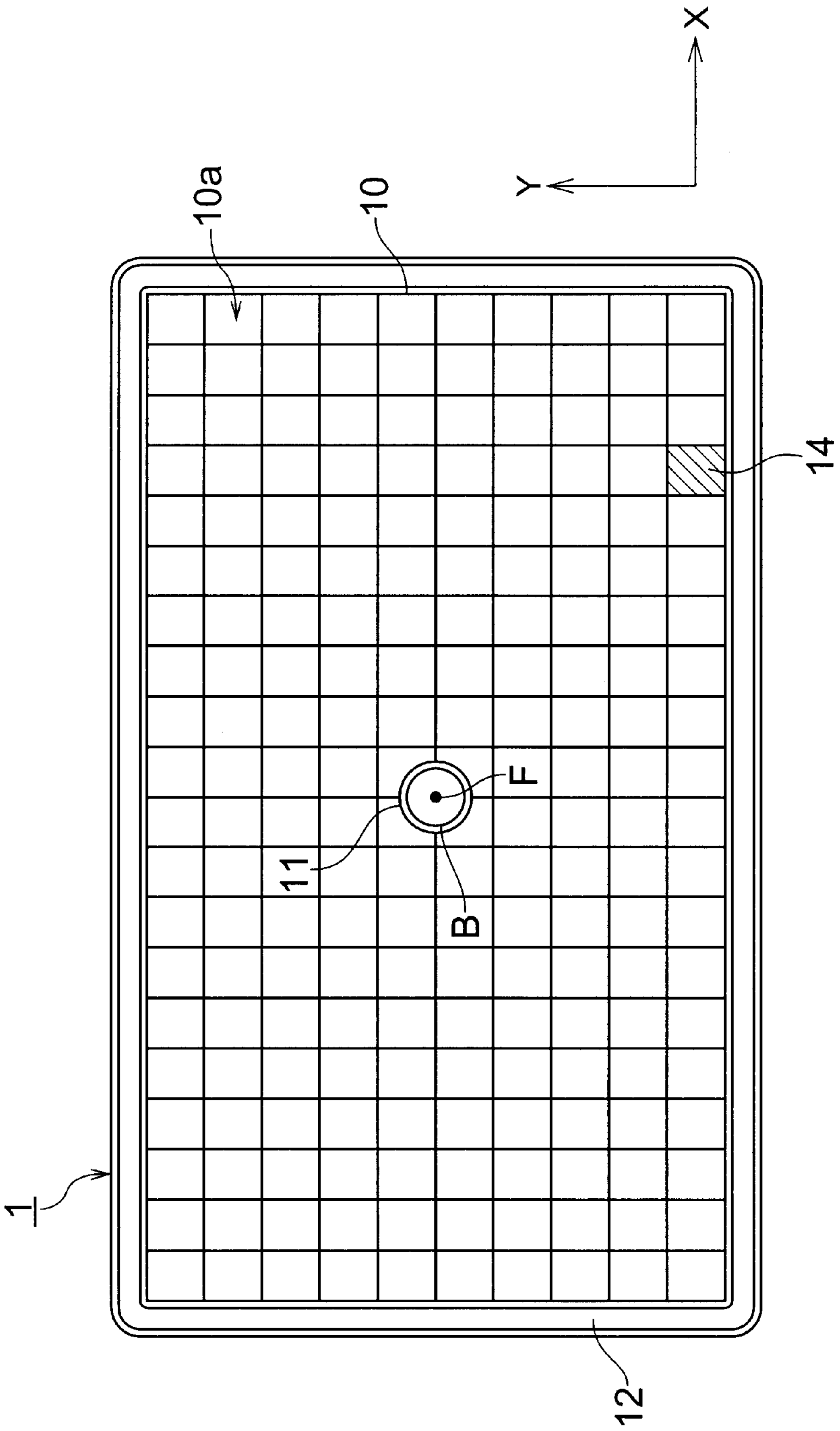
FIG. 2 is a plan view to show the structure of the reflector in the vehicle lamp illustrated in FIG. 1.

FIG. 1 is an exploded perspective view, partly broken, of the structure of an embodiment of the vehicle lamp provided with the reflector, which has the reflective surface created by the reflective surface determining method of the reflector in the vehicle lamp according to the present invention. FIG. 2 is a plan view to show the structure of the reflector in the vehicle lamp illustrated in FIG. 1. In FIG. 1, the structures of fixing and positioning portions of the reflector and lens are omitted from the illustration. In the description below, the X-, Y-, and Z-coordinate axes are defined as illustrated in FIG. 1 and FIG. 2; the X-axis is taken along the lateral direction of the lamp, the Y-axis along the vertical direction, and the Z-axis along the depthwise direction, which is the direction of the optical axis Ax of the lamp.

The vehicle lamp of the present embodiment can be applied, for example, to the marker lamps such as tail lamps of automobiles and the like, and this lamp is constructed with the reflector 1 and the lens 3, as illustrated in FIG. 1.

The reflector 1 is formed so as to spread in directions approximately normal to the optical axis Ax, which is preset from the longitudinal direction of the vehicle to which the lamp is to be mounted, and the light projecting direction of the lamp, and is formed in an almost rectangular shape in a view from the direction of the Z-axis. The reflector 1 has a reflector part 10 a surface of which opposite to the lens 3 placed in front thereof along the optical axis Ax is a reflective surface 10*a* for reflecting light, and a rim part 12 for positioning and fixing to the lens 3, which is structured so as to enclose the reflective surface 10*a*. A light-source bulb B is inserted into a light-source inlet 11 bored at the almost center position in the reflector part 10 and is fixed relative to the reflector 1 so that the illuminant point F thereof is located at a predetermined position (light source position) on the optical axis Ax. The lens 3 is set nearly perpendicular to the optical axis Ax.

It is noted herein that the present embodiment provides an example for the various conditions, including the peripheral shape of the approximately rectangular shape of the reflector 1 (the outline shape of the rim part 12), the setting angle of the lens 3 relative to the optical axis Ax, the location of the light-source bulb B, and so on. In general, those conditions are appropriately set in consideration of the shape constraints imposed from the body side, including the volume and shape of the lamp receiving part of the body, the continuous shape of the outer surface of the lamp (the outer surface of the lens) from the other body portions. There are no particular restrictions on specific production methods of producing the reflective surface 10*a* of the reflector 1, and the embodiment described below can be applied to lamps provided with reflectors formed by various production methods.

In FIG. 1, the reflector 1 and lens 3 forming the vehicle lamp are illustrated in a disassembled state and the shape of the reflective surface 10*a* is shown by partly breaking the upper and right portions (in the figure) of the rim part 12 of the reflector 1. In this FIG. 1, however, the array of reflective surface elements 14 (see FIG. 2) forming the reflective surface 10*a* are not illustrated and the surface shape thereof is schematically shown by the free-formed surface 20, which is the basic shape of the reflective surface 10*a*.

The free-formed surface 20 is a curved surface used for determination of the shape of the reflective surface, as a surface to specify the basic shape of the reflective surface 10*a*. The basic shape is not a single paraboloid of revolution, but the free-formed surface selected as a curved surface satisfying certain conditions, e.g., satisfying the shape constraints.

The reflective surface 10*a* is formed by assigning a plurality of reflective surface elements 14 (individual sections of the rectangular shape in FIG. 2) to respective segments obtained by dividing the free-formed surface 20 of the basic shape into an array pattern as illustrated in FIG. 2.

In FIG. 2, one of the reflective surface elements 14 is hatched in order to clarify the range thereof. In the present embodiment the reflective surface 10*a* is constructed in the divided structure of the segments at fixed intervals in the X-axis direction and in the Y-axis direction normal to each other so that the shapes of the segments corresponding to the respective, reflective surface elements 14 are same and rectangular in a view from the Z-axis direction. Each reflective surface element 14 is formed in such a reflective surface shape as to reflect the light from the light-source bulb B into the direction along the optical axis Ax.

Figure 3:
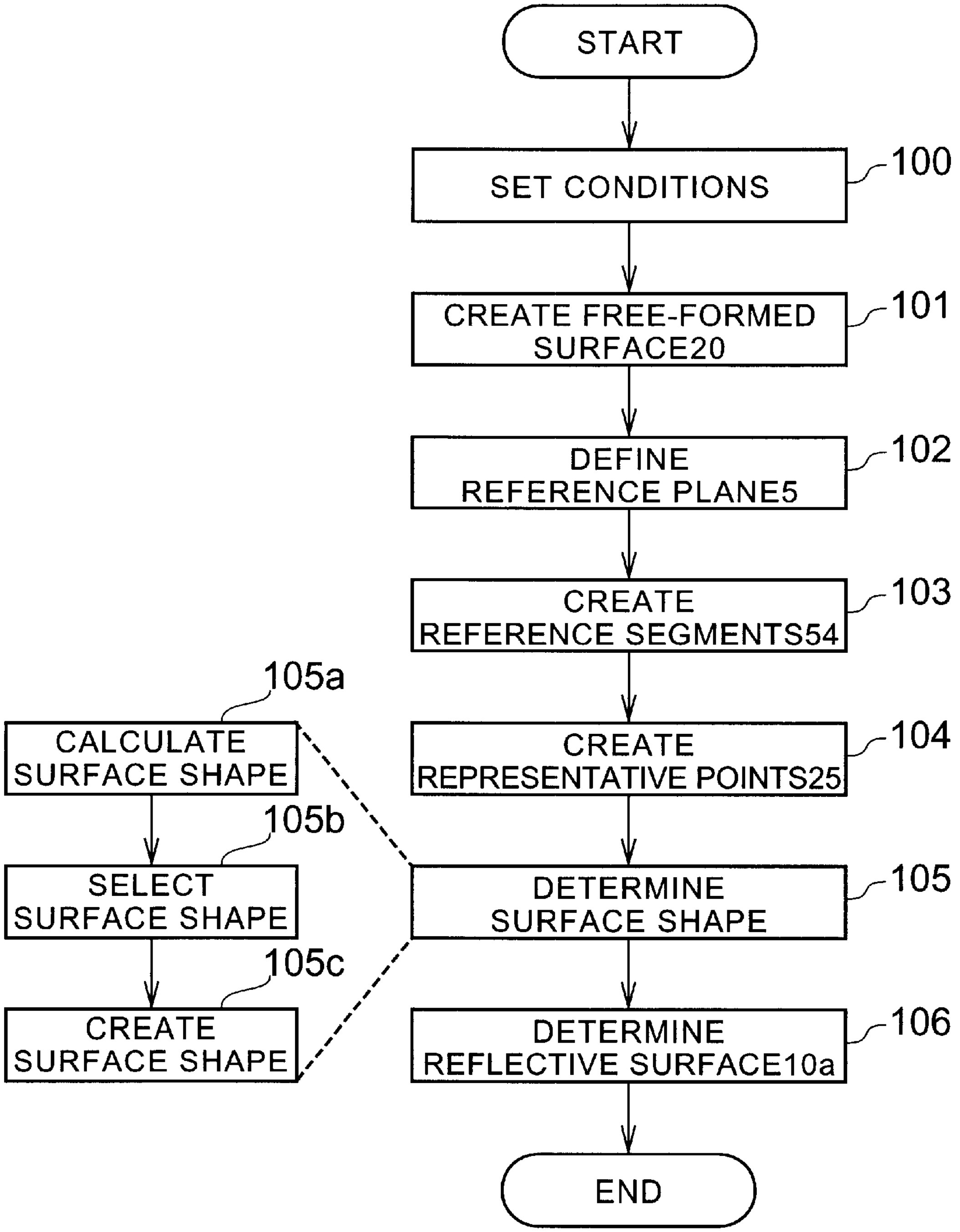
FIG. 3 is a flowchart to show an embodiment of the reflective surface determining method of the reflector in the vehicle lamp.

The reflective surface determining method of the reflector in the vehicle lamp will be described below using the example of the vehicle lamp in the above structure. FIG. 3 is a flowchart to show an embodiment of the reflective surface determining method of the reflector in the vehicle lamp according to the present invention. The reflective surface determining method according to the. present embodiment has steps of a condition setting step 100, a free-formed surface creating step 101, a reference plane defining step 102, a reference segment creating step 103, a representative point creating step 104, a surface shape determining step 105, and a reflective surface determining step 106. Further, the surface shape determining step 105 consists of a surface shape calculating step 105*a,* a surface shape selecting step 105*b,* and a surface shape creating step 105*c*.

[Condition Setting Step] (Step 100)

Various conditions necessary for the determination of shape are first set in the determination of the shape of the reflective surface of the reflector used in the vehicle lamp.

The set conditions are, for example, the position where the light-source bulb B is located and the position of the illuminant point F thereof (light source position), the optical axis Ax which is an axis passing the light source position and which specifies the direction into which the light from the light source is reflected by the reflective surface to be emitted from the lamp, and so on. Other conditions may also be set if necessary. Besides the set conditions, the shape constraints from the body side and other conditions are preliminarily imposed on the lamp or on the reflector.

[Free-formed Surface Creating Step] (Step 101)

The next step is a step of creating the free-formed surface 20 as a basic shape of the reflective surface 10*a*.

The free-formed surface 20 is created in the shape satisfying the conditions from the functional aspect of the lamp, the shape constraints from the body side, and so on. One of the conditions from the functional aspect for the free-formed surface 20 is light uniformity concerning the light reflection characteristics of the reflective surface 10*a,* and required functions differ depending upon types of lamps. About these conditions, the shape of the free-formed surface 20 is determined so as to fully meet the functions required of the individual lamps, with reference to the conditions of the light source position (the light-source bulb B and the illuminant point F) and the optical axis Ax set in the condition setting step 100.

Since the shape constraints including decrease in the depth of the lamp need to be satisfied at the same time, the shape is determined with optimized functions under the shape constraints. For example, there are cases where particularly strict shape constraints are imposed on a specific part of the reflector because of the shape of the light receiving part of the body, and then the free-formed surface 20 is created so as to restrain degradation and change in the functions at such part.

[Reference Plane Defining Step] (Step 102)

The next step is a step of defining the reference plane for the free-formed surface 20 created in the free-formed surface creating step 101.

Figure 4:
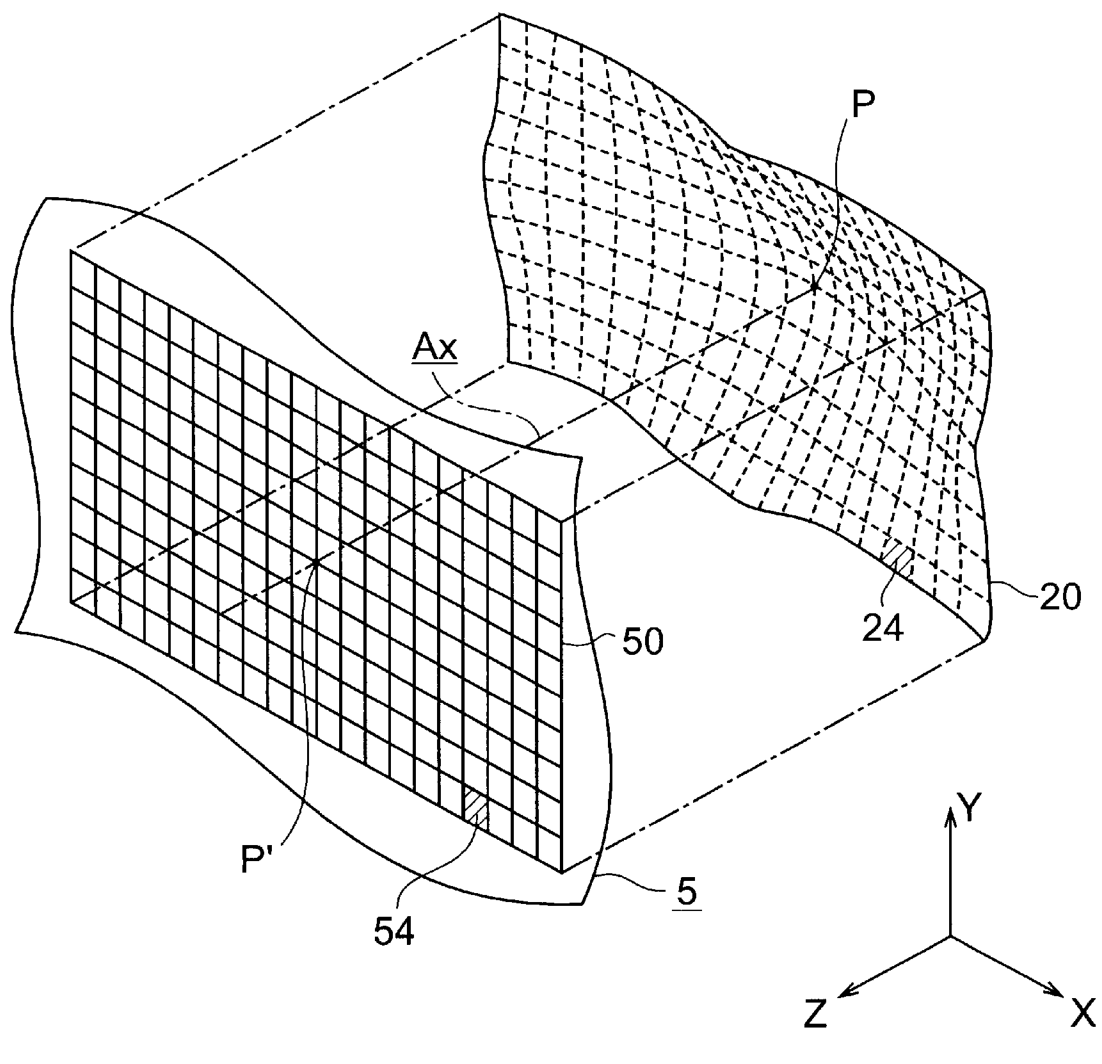
FIG. 4 is a perspective view to show a method of dividing the free-formed surface into an array of segments with the reference plane.

FIG. 4 shows the reference plane 5 defined for the free-formed surface 20. The reference plane 5 is a plane used for the division of the free-formed surface 20 into the segments and for the determination of the shapes of the reflective surface elements as described hereinafter, and is defined as a plane facing the free-formed surface 20. In the present embodiment, as illustrated in FIG. 4, the reference plane 5 is defined by the X-Y plane normal to the optical axis Ax.

In the following, projection between the reference plane 5 and the free-formed surface 20 is effected all along the Z-axis (the optical axis Ax).

[Reference Segment Creating Step] (Step 103)

The next step is a step of dividing the free-formed surface 20 by use of the reference plane 5 defined in the reference plane defining step 102 to create a plurality of reference segments.

First, a reflective surface outline 50 corresponding to the reflective surface 10*a* to be created using the free-formed surface 20 as a basic shape is created on the reference plane 5 including a point P' corresponding to a point P on the free-formed surface 20, where the optical axis Ax passes. The region on the reference plane 5 including the interior of this reflective surface outline 50 is divided by a predetermined dividing method to create reference segments 54.

In FIG. 4, two dividing directions are selected along the X-axis direction and the Y-axis direction perpendicular each to the optical axis Ax and perpendicular to each other, and the interior of the reflective surface outline 50 is divided at fixed intervals along the respective directions, to create the rectangular reference segments 54 arranged in an array pattern. This structure of the reference segments 54 corresponds to the array structure of the reflective surface elements 14 in the reflector 1 illustrated in FIG. 2. For the creation of the reference segments 54, another point different from the point P' may also be used as a base point for the division.

[Representative Point Creating Step] (Step 104)

The next step is a step of selecting reference representative points for the respective reference segments 54 created in the reference segment creating step 103 and projecting the reference segments 54 and the reference representative points onto the free-formed surface 20 to create segments and representative points.

Figure 5:
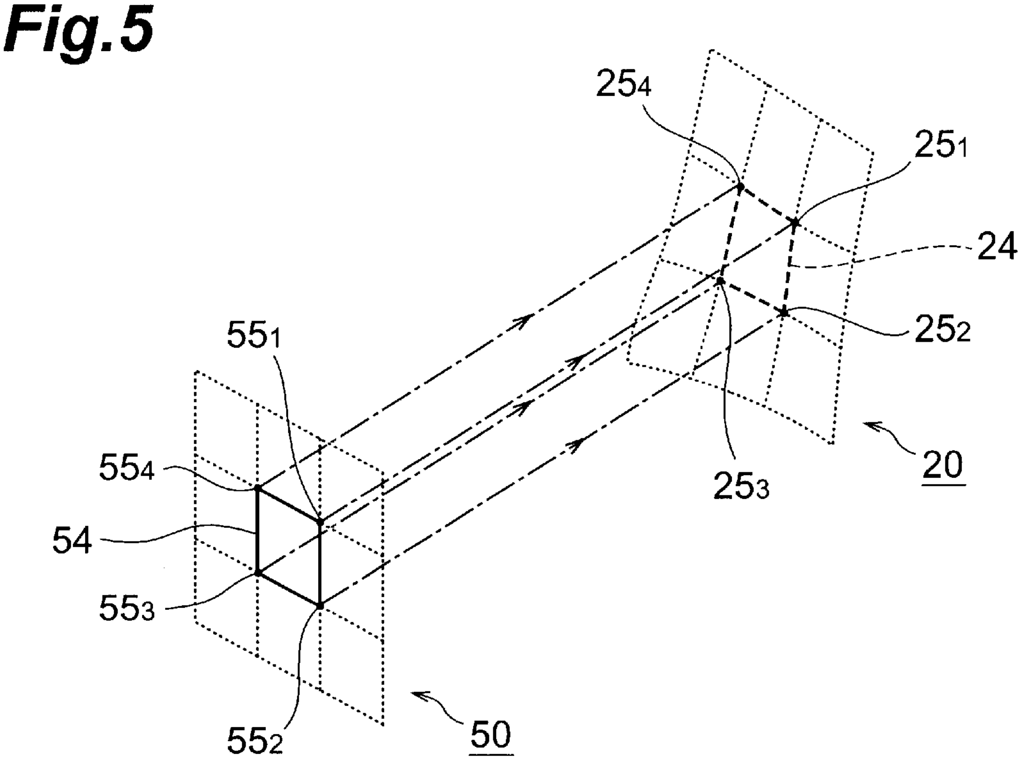
FIG. 5 is a perspective view as a partly enlarged view to show correspondence between a reference segment of the reference plane and a segment of the free-formed surface.

FIG. 5 is a perspective view to show a reference segment 54 in the reflective surface outline 50 illustrated in FIG. 4, and a corresponding portion on the free-formed surface 20. In FIG. 5, one of the reference segments 54 is indicated as an enlarged portion indicated by a solid line. The reference representative points are selected for each of the reference segments 54. In the present embodiment, for a rectangular reference segment 54, four vertexes thereof are selected as reference representative points $\mathbf{55}_1$ to $\mathbf{55}_4$.

Further, the reference segment 54, and the reference representative points $\mathbf{55}_1$ to $\mathbf{55}_4$ selected for the reference segment 54 are projected onto the free-formed surface 20, as illustrated in FIG. 5, to create a segment 24 and representative points $\mathbf{25}_1$ to $\mathbf{25}_4$ in the free-formed surface. In FIG. 5, the segment 24 corresponding to the reference segment 54 indicated by the solid line is indicated by a dashed line, whereas the reference segments and the segments near them are indicated by dotted lines.

The representative points $\mathbf{25}_1$ to $\mathbf{25}_4$ are points to specify positions in the segment 24 used for the determination of the surface shape of the reflective surface element 14 assigned to each segment 24 as described hereinafter. The representative points 25 for the segment 24 on the free-formed surface 20 are thus created in such a way that the number and positions of the representative points are determined by selecting the reference representative points 55 in the reference segment 54 on the reference plane 5, and that thereafter the reference representative points 55 are projected onto the free-formed surface 20, as described above.

This representative point creating step 104 and the surface shape determining step 105 described hereinafter are successively carried out for each of the segments 24 and reference segments 54, and the creation of representative points and the determination of surface shape are carried out for all the segments 24. The segments 24 are constructed throughout the entire free-formed surface 20 by repetition of these steps and are arranged in the array pattern in a view from the Z-axis direction, as indicated by the dashed lines in FIG. 4. The reference segment 54 and the segment 24 indicated by hatching in FIG. 4 correspond to the reflective surface element 14 indicated by hatching in FIG. 2.

[Surface Shape Determining Step] (Step 105)

In the present embodiment, the surface shape determining step 105 consists of the surface shape calculating step 105*a*, the surface shape selecting step 105*b*, and the surface shape creating step 105*c*, which will be described below.

[Surface Shape Calculating Step] (Step 105*a*)

First, a shape parameter for determining the surface shape in the segment 24 is calculated for each of the representative points $\mathbf{25}_1$ to $\mathbf{25}_4$ created in the representative point creating step 104.

Figure 6:
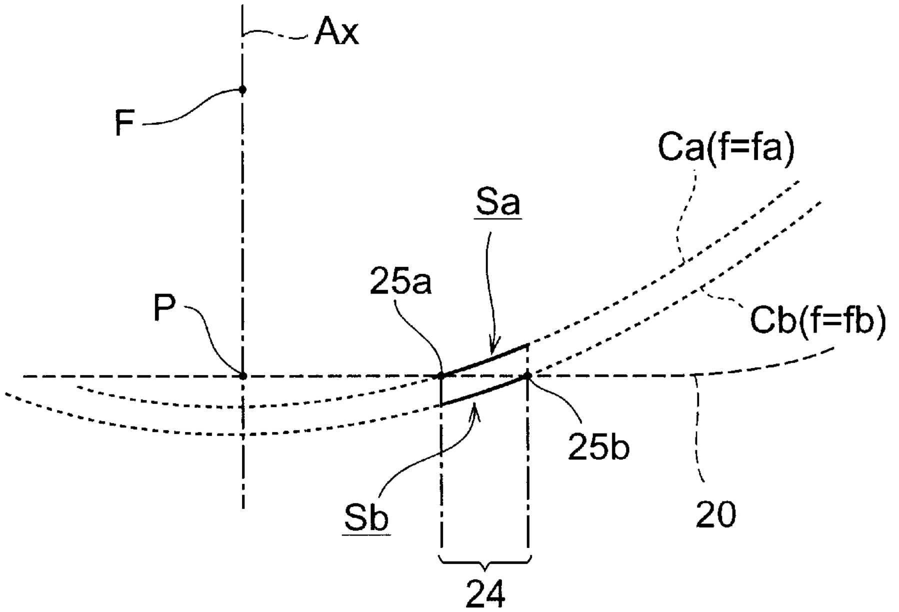
FIG. 6 is a schematic diagram to show calculation of shape parameters for respective, representative points of a segment.

FIG. 6 is a schematic diagram to illustrate the calculation of the shape parameters for the respective representative points in the example wherein the basic surface shape of the reflective surface element 14 assigned to the segment 24 is a paraboloid of revolution. For simplicity, let us consider a curve shape on the free-formed surface 20 including the point P which the optical axis Ax passes, and points at two ends of the curve of the segment 24 are defined as representative points 25*a* and 25*b*.

The reflective surface elements 14 assigned to the respective segments 24 obtained by dividing the reflective surface 10*a* are normally formed using the basic surface shapes of paraboloids of revolution created in different focal lengths f with the center axis along the optical axis Ax and the focus at the illuminant point F (light source position). The focal length f for each surface is determined from the illuminant point F and the optical axis Ax and from the position of the segment 24 on the free-formed surface 20 so as to reflect the light from the illuminant point F into the direction of the optical axis Ax. In this case, the focal length f of the paraboloid of revolution is the shape parameter for specifying the surface shape.

In the example illustrated in FIG. 6, values fa and fb of the focal lengths f being the shape parameters are calculated for the two representative points 25*a* and 25*b* used for the determination of surface shape. In FIG. 6, a curve Ca represents a paraboloid of the focal length fa passing the representative point 25*a* and a curve Cb a paraboloid of the focal length fb passing the representative point 25*b*.

For the segment 24 illustrated in FIG. 5, four focal lengths $f_1$ to $f_4$ corresponding to the respective representative points $\mathbf{25}_1$ to $\mathbf{25}_4$ are calculated, similarly using the focal length f of each paraboloid of revolution as a shape parameter.

[Surface Shape Selecting Step] (Step 105*b*)

The next step is a step of selecting a shape parameter applied to the surface shape in the segment 24 from the shape parameters for the respective representative points $\mathbf{25}_1$ to $\mathbf{25}_4$ calculated in the surface shape calculating step 105*a*.

This selection of the shape parameter will be described referring to FIG. 6. In FIG. 6, the focal lengths fa and fb are calculated as the shape parameters for the two, respective, representative points 25*a* and 25*b* of the segment 24 as described above. Either one of these focal lengths fa and fb is selected as a focal length fx used for the determination of the surface shape in the segment 24.

When the focal length fa is selected as fx, the surface shape in the segment 24 is the surface shape Sa indicated by the solid line in FIG. 6. When the focal length fb is selected as fx, the surface shape in the segment 24 is the surface shape Sb. Which focal length is selected is determined from various conditions about each segment 24 so as to select the better out of the surface shapes corresponding to the respective focal lengths.

In FIG. 5, one of the four focal lengths $f_1$ to $f_4$ calculated based on the positions of the respective representative points $\mathbf{25}_1$ to $\mathbf{25}_4$ is selected as the focal length fx applied to the determination of the surface shape, for the surface shape of the reflective surface element 14 assigned to the segment 24.

Selection criteria for the selection of the shape parameter for the surface shape of the reflective surface element 14 in each segment 24 can be determined depending upon the various conditions imposed on the reflector 1 and upon the position of each segment 24 relative to the light-source bulb B. Specifically, it can be contemplated that they are selected, for example, from the relation with the shape constraints etc., because the reflective surface shape varies depending upon the selection of the surface shape; e.g., the segment portion of the reflective surface 10*a* becomes convex either forward or backward, depending upon the selection. Since the conditions such as the quantity and the range of incident light to each reflective surface element 14 vary depending upon combination with the surface shapes of other reflective surface elements 14 present near the element of interest, the selection of the shape parameter may also be carried out in consideration of the relation of position and shape with such other reflective surface elements 14.

[Surface Shape Creating Step] (Step 105*c*)

The next step is a step of creating the surface shape of the reflective surface element 14 assigned to the segment 24, based on the shape parameter selected in the surface shape selecting step 105*b*.

Figure 7:
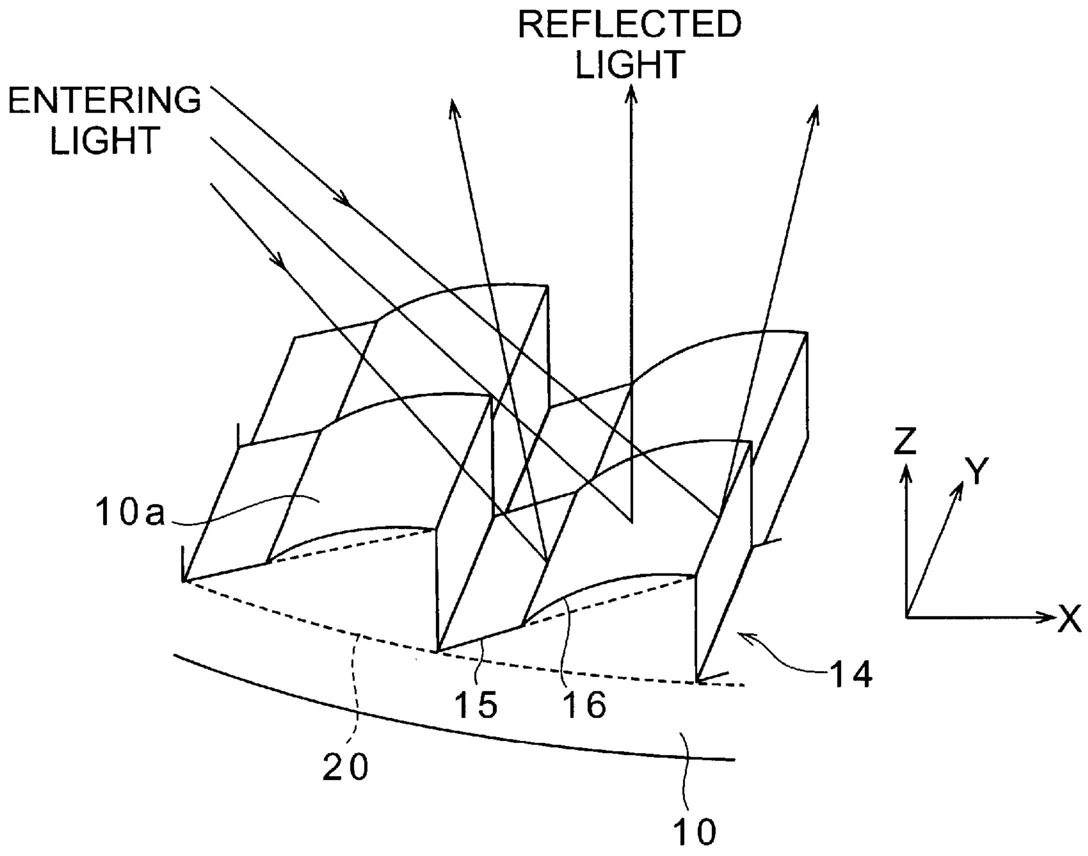
FIG. 7 is a perspective view to show an example of the reflective surface shape of the reflective surface elements.

FIG. 7 is a perspective view to show a partly extracted portion of the reflector part 10 in which the reflective surface 10*a* is formed, which shows an example of the reflective surface of the reflective surface element 14 in the present embodiment. It is also possible to form the entire surface shape of each reflective surface element 14 as the shape of a paraboloid of revolution corresponding to the selected focal length fx, but in the present embodiment the surface shape of each reflective surface element 14 is created by using a paraboloid of revolution as a basic surface shape and modifying the shape of the paraboloid of revolution so as to provide it with predetermined light diffusing capability.

In FIG. 7, each of the surface shapes of the reflective surface elements 14 is created in the shape comprised of a paraboloid part 15 in the shape of the paraboloid of revolution having the above focal length fx, and a diffuse reflection part 16 in the convex shape relative to the shape of the paraboloid of revolution with the focal length fx so as to yield the predetermined light diffusing capability. The paraboloid part 15 is a portion located behind the adjacent reflective surface element 14, while the diffuse reflection part 16 is formed in a portion to which the light from the light-source bulb B (light source position) is actually incident.

[Reflective Surface Determining Step] (Step 106)

The next step is a step of determining the reflective surface 10*a* including a plurality of reflective surface elements 14 by assigning the reflective surface elements 14 of the surface shapes created in the surface shape creating step 105*c* to the respective segments 24.

Namely, the surface shape is determined through the above steps for each of the segments 24 created for the whole of the free-formed surface 20 as illustrated in FIG. 4. Then the reflective surface elements 14 are created based on the respectively corresponding surface shapes, as in the example illustrated in FIG. 7, and are assigned to the respective segments 24 to determine the reflective surface 10*a* (see FIG. 2) the basic shape of which is the free-formed surface 20.

The effects of the reflective surface determining method of the reflector in the vehicle lamp described above will be described below.

The reflective surface shape matching the various shape constraints can be realized by employing the free-formed surface as the basic shape of the reflective surface. However, it makes complex the determining method of the reflective surface shape in each of the portions on the free-formed surface on the other hand, because the shape of the free-formed surface differs depending upon individual lamps and the shape itself becomes complex.

In the reflective surface determining method in the above embodiment, different from the above, the reflective surface is not determined on the free-formed surface, but the reflective surface shape is determined in such a way that the reference plane normal to the optical axis is defined, the free-formed surface is projected onto this reference plane, the design works for determining the reflective surface shape are carried out on the reference plane, and thereafter the result is again projected onto the free-formed surface. This permits simplification of the determining steps of the reflective surface and decrease in the time necessary for designing.

Particularly, the reference plane is equivalent to the field where the observer observes the reflective surface and the lamp provided with the reflector from the optical-axis direction. When the reflective surface is determined by making use of this reference plane, it becomes feasible to suitably set and control the shape and appearance of the reflector and the lamp relative to the optical-axis direction and the light reflection characteristics thereof accordingly.

For example, since the segments on the free-formed surface are observed in an aligned state with the reference segments on the reference plane when observed from the optical-axis direction, the appearance of the reflector and the lamp can be suitably determined by the above determining method. When the structure of these segments is determined using the reference plane, though depending upon the lens structure of the lamp, it becomes feasible to set functional sharing of light diffusing function or the like between the two members by suitably determining the shapes of the two members in connection. Particularly, the above shape determining method permits uniform handling with the reference plane in the determination of structure and the setting of light reflection characteristics, independent of the shape of the free-formed surface and the shape of the reflective surface to be designed.

The determination of the surface shape is made more efficient by selecting the representative points for the respective segments and determining the shape parameters to specify the surface shapes by use of those representative points. Particularly, when these representative points are not selected on the segments but are selected by first selecting the reference representative points in the reference segments on the reference plane and thereafter projecting them onto the free-formed surface, the representative points can be selected independent of the shape of the free-formed surface.

In the above embodiment a plurality of representative points are created for each segment and the calculation and selection of the shape parameter is carried out for each of them. Further, the shape parameter for each representative point is calculated by applying the common representative point selection method to the segments on the free-formed surface, and at the stage thereafter of selecting a parameter for the surface shape out of those shape parameters, a suitable representative point for each segment and the surface shape based thereon are selected.

The determining method as described provides large degrees of freedom in the selection and determination of the surface shape, e.g., the capability of setting or changing the surface shape of each segment in the relation with the surface shapes of the reflective surface elements assigned to the adjacent segments, and thus permits the improvement in the light reflection characteristics as a whole of the reflective surface. For the selection of the shape parameter, any other selection method may also be applied out of those including a method using an average of shape parameters at respective representative points, selection of a shape parameter between maximum and minimum of shape parameters at respective representative points, and so on.

The reflective surface determining method of the reflector in the vehicle lamp according to the present invention is not limited to the above embodiment, but can involve various modifications and structural changes according to specific constraints and conditions imposed on individual lamps.

The reference plane 5 for the free-formed surface 20 does not always have to be limited to the plane normal to the optical axis, but the reference plane may also be defined as one of other planes facing the free-formed surface 20 except it. These reference planes are also equivalent to the field where the observer observes the reflective surface or the lamp from their respectively corresponding direction, and they can also simplify the determination steps, as in the case where the reference plane is the plane normal to the optical axis.

In the above embodiment the four vertexes are selected as the representative points $\mathbf{25}_1$ to $\mathbf{25}_4$ for each of the rectangular segments 24, but the representative points may also be selected, for example, as four points at respective centers of the four edges without having to be limited to the above selection method of representative points. It is also possible to select internal points in the rectangular shape as representative points instead of those on the periphery. Another potential is that different selecting methods of representative points are applied to the respective segments.

The number of representative points does not always have to be four, but it can be one per segment, for example, when it is preliminarily clear which point is used as a reference of the surface shape. In this case, the shape parameter calculated for that representative point is used as a shape parameter applied to that segment, as it is.

A parameter other than the focal length of the paraboloid of revolution may also be used as the shape parameter for specifying the surface shape. The diffuse reflection regions for diffuse reflection of the light from the light source may also be selected from various forms in consideration of matching with the light diffusing function of the lens used in the lamp.

For example, in the case of the reflective surface element 14 illustrated in FIG. 7, the diffuse reflection part 16 is formed in the cylindrical shape so as to yield light diffusing capability only in the X-axis direction, and the light is reflected in a state of nearly parallel light in the Y-axis direction. In this case, the lens used is the lens 3 (see FIG. 1) having the lens steps 3*a* with light diffusing capability in the Y-axis direction.

This diffuse reflection region may also be formed in the surface shape having the light diffusing capability both in the X-axis and Y-axis directions; or, the light diffusing action may also be assigned all to the lens while the reflective surface is formed in the shape without the diffuse reflection part. Specific examples of the shape of the diffuse reflection region are a concave shape, a shape obtained by deforming the paraboloid of revolution into a simple plane, a torus surface shape, and so on, in addition to the cylindrical convex shape.

Concerning setting of the details of the reflective surface shape, for example, in the case where the reflector is produced as a molded product of resin with dies, since there are restrictions on the reflective surface shape from the shape of a cutter or the like used in production of the dies, the reflective surface shape needs to be determined, taking such conditions into consideration as well. It is also preferable to determine the reflective surface shape so as to decrease optical loss due to steps at borders between the reflective surface elements.

Figure 8:
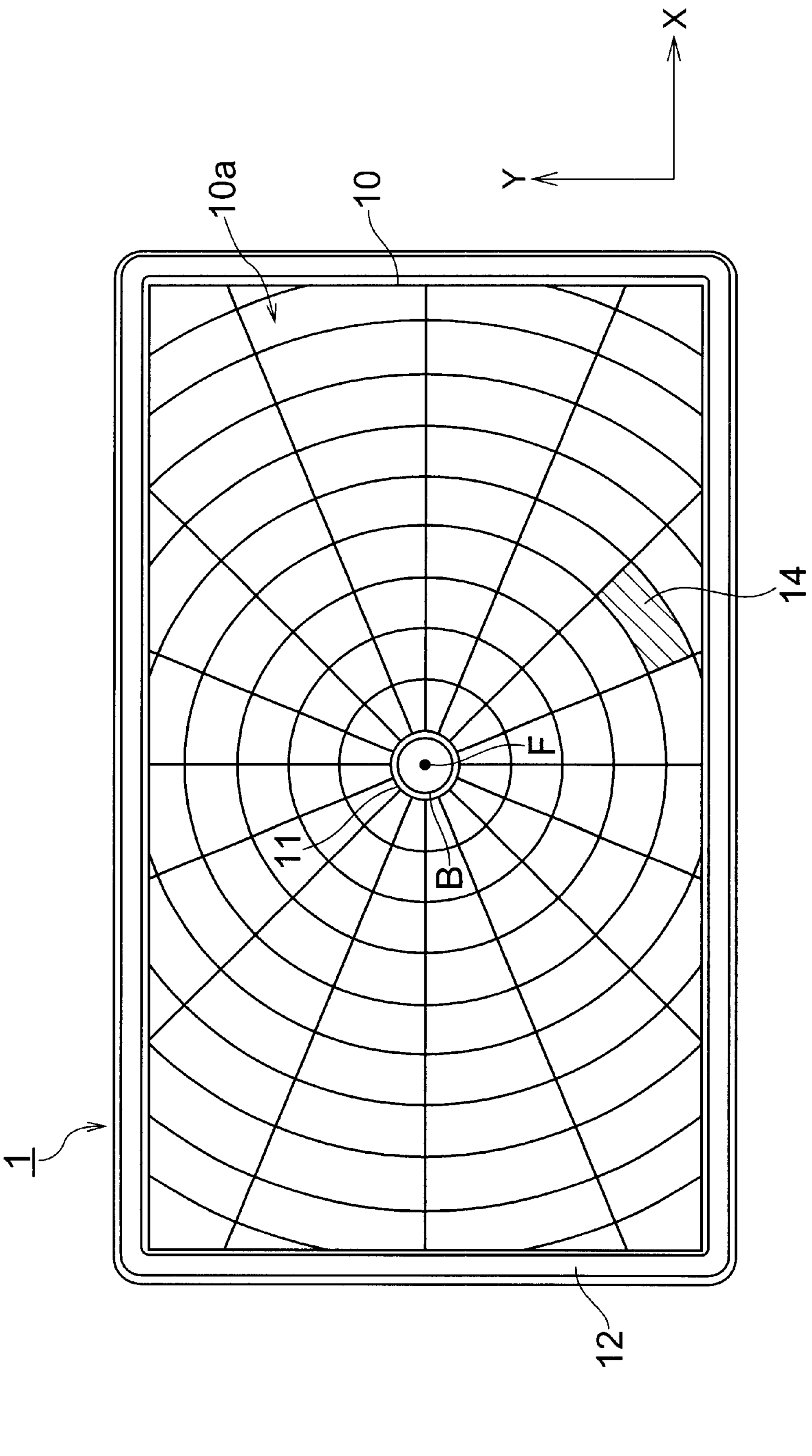
FIG. 8 is a plan view to show another example of the structure of the reflector in the vehicle lamp.

The shape of the segments in the reflective surface 10*a* does not always have to be the rectangular shape presented in the above embodiment, either. FIG. 8 is a plan view to show another configuration of the reflector in the vehicle lamp. In this example, the interior of the reflective surface outline 50 is divided along radial directions of radius vectors with the center at an intersection between the reference plane 5 and the optical axis Ax and along concentric circumference directions with the center at the intersection to create the reference segments 54, and they are projected to form the shapes of the segments 24 and the reflective surface elements 14, which are sectorial when viewed from the Z-axis direction.

A selection method of representative points for such segment shapes can be, for example, a method of selecting four vertexes of each sectorial shape, as in the case of the rectangular shape. The above reflective surface determining method can also be applied similarly to cases where the reflective surface is divided in various other segment shapes. As for the types of the lamps, the above method can also be applied to reflectors used not only in the marker lamps, but also in the vehicle lamps of various types.

As detailed above, the reflective surface determining method of the reflector in the vehicle lamp according to the present invention provides the following effects. Namely, in the reflective surface determining method of the reflector wherein the free-formed surface is used as a basic shape, the free-formed surface is divided into segments, and the reflective surface elements are assigned to the respective segments, the reference plane facing the free-formed surface is defined and is utilized in the surface shape determining step of the reflective surface element in each portion of the reflective surface. This permits the determination of the reflective surface to be executed on a uniform basis, independent of the shape of the free-formed surface, which simplifies the design steps thereof and decreases the time necessary for designing.

Since this reference plane is equivalent to the field where the observer observes the reflector or the lamp from the direction normal to the reference plane, the shape and appearance of the reflective surface, and the light reflection characteristics can be suitably set and controlled by making use of this plane in the determination of the shape of the reflective surface. Further, when the shape parameter at the representative point is used for the determination of the surface shape in each segment, the determining step can be made more efficient. For the selection of the representative points, the selection of representative points independent of the shape of the free-formed surface becomes feasible by selecting the reference representative points on the reference plane.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of determining a reflective surface of a reflector used in a vehicle lamp, comprising:

a free-formed surface creating step of creating a free-formed surface satisfying a predetermined shape constraint;

a reference plane defining step of defining a reference plane as a plane facing said free-formed surface;

a reference segment creating step of creating a reflective surface outline on said reference plane and dividing a region on said reference plane including the interior of said reflective surface outline, into a plurality of reference segments;

a representative point creating step of selecting reference representative points for said respective reference segments and projecting said reference segments and said reference representative points onto said free-formed surface, thereby creating dividing segments of said free-formed surface and representative points specifying positions for determining surface shapes in said segments;

a surface shape determining step of finding shape parameters at said representative points for said respective segments and determining said surface shapes in said segments, based on said shape parameters; and a reflective surface determining step of assigning reflective surface elements having said surface shapes determined, to said respective segments to determine a reflective surface comprising a plurality of said reflective surface elements.

2. The method according to claim 1, wherein said representative point creating step comprises a step of selecting a plurality of said reference representative points for each of said reference segments and projecting said reference representative points onto said free-formed surface to create a plurality of said representative points, and wherein said surface shape determining step comprises:

a surface shape calculating step of calculating said shape parameters for said respective representative points, a surface shape selecting step of selecting said shape parameters applied to said surface shapes in said segments, from said shape parameters for the plurality of said representative points, and a surface shape creating step of creating said surface shapes in said respective segments, based on said shape parameters selected.

3. The method according to claim 1, further comprising a condition setting step of setting a light source position where a light source is to be placed, and an optical axis passing said light source position and specifying a direction into which light from said light source is to be reflected by the reflector.

4. The method according to claim 2, further comprising a condition setting step of setting a light source position where a light source is to be placed, and an optical axis passing said light source position and specifying a direction into which light from said light source is to be reflected by the reflector.

5. The method according to claim 3, wherein said reference plane defining step comprises a step of defining said reference plane as a plane normal to said optical axis.

6. The method according to claim 3, wherein said surface shape determining step comprises a step of determining said surface shapes comprising shapes of paraboloids of revolution with a focus at said light source position and with a center axis along said optical axis, and wherein said shape parameters comprise focal lengths of said paraboloids of revolution.

7. The method according to claim 3, wherein said surface shape determining step comprises a step of determining said surface shapes as shapes each having a diffuse reflection region for diffusely reflecting the light from said light source position.

8. The method according to claim 3, wherein said reference segment creating step comprises a step of dividing the interior of said reflective surface outline along a first direction substantially normal to said optical axis and along a second direction substantially normal to each of said optical axis and said first direction to create said plurality of reference segments so that each of said reference segments is rectangular.

9. The method according to claim 8, wherein said representative point creating step comprises a step of selecting four vertexes of each of said reference segments as said plurality of reference representative points.

10. The method according to claim 3, wherein said reference segment creating step comprises a step of dividing the interior of said reflective surface outline along radial directions of radius vectors from a center at an intersection between said reference plane and said optical axis and along concentric circumference directions with a center at said intersection to create said plurality of reference segments so that each of said reference segments is sectorial.

11. The method according to claim 10, wherein said representative point creating step comprises a step of selecting four vertexes of each of said reference segments as said plurality of reference representative points.

* * * * *